United States Patent [19]

Hilton et al.

[11] Patent Number: 4,561,517

[45] Date of Patent: * Dec. 31, 1985

[54] CRUISE CONTROL MODULATOR

[75] Inventors: Carl W. Hilton; Harold L. Bullard, both of Muskegon, Mich.

[73] Assignee: Return on Investment Corporation, Muskegon, Mich.

[*] Notice: The portion of the term of this patent subsequent to Oct. 4, 2000 has been disclaimed.

[21] Appl. No.: 476,134

[22] Filed: Mar. 17, 1983

Related U.S. Application Data

[62] Division of Ser. No. 204,066, Nov. 4, 1980, Pat. No. 4,407,385.

[51] Int. Cl.[4] ............... B60K 31/00; F02D 31/00
[52] U.S. Cl. ............... 180/175; 123/360; 123/389; 251/61.5
[58] Field of Search ............... 180/175–177; 123/360, 389; 251/61, 61.1, 61.5

[56] References Cited

U.S. PATENT DOCUMENTS

| | | | |
|---|---|---|---|
| 1,145,671 | 7/1915 | Butcher | 251/61.5 |
| 1,171,695 | 2/1916 | Brady | 251/61.5 |
| 2,148,729 | 2/1939 | Coffey | 123/389 X |
| 2,519,859 | 8/1950 | Teetor | 180/175 X |
| 2,692,980 | 10/1954 | Platt | 180/54 R X |
| 2,825,418 | 3/1958 | Kershman | 180/171 X |
| 3,023,828 | 3/1962 | Fuller et al. | 180/177 |
| 3,157,244 | 11/1964 | McMurray et al. | 180/177 |
| 3,158,141 | 11/1964 | Harris | 123/389 |
| 3,211,251 | 10/1965 | Parker | 180/175 |
| 3,215,222 | 11/1965 | Parker | 180/175 |
| 3,250,261 | 5/1966 | Wiles | 123/389 |
| 3,354,873 | 11/1967 | Burnell | 123/389 |
| 3,388,765 | 6/1968 | Sheppard | 180/172 |
| 3,485,316 | 12/1969 | Slavin et al. | 180/176 |
| 3,494,337 | 2/1970 | Alderson | 123/389 |
| 3,596,642 | 8/1971 | Nakata | 180/177 X |
| 3,621,954 | 11/1971 | Ligon et al. | 180/175 |
| 3,958,542 | 5/1976 | Tanner | 180/54 R X |
| 3,960,123 | 6/1976 | Berninger | 123/389 X |
| 3,999,622 | 12/1976 | Reed | 180/177 |
| 4,026,255 | 5/1977 | Weiler, Jr. | 180/54 R X |
| 4,106,584 | 8/1978 | Matsubara | 180/177 |
| 4,142,602 | 3/1979 | Mann | 180/177 |
| 4,159,753 | 7/1979 | Boche | 180/170 |
| 4,170,274 | 10/1979 | Collonia | 180/176 |
| 4,186,707 | 2/1980 | Driggers | 251/61 X |
| 4,217,969 | 8/1980 | Riddel | 180/175 |
| 4,407,385 | 10/1983 | Hilton et al. | 180/175 |

Primary Examiner—Joseph F. Peters, Jr.
Attorney, Agent, or Firm—Price, Heneveld, Huizenga & Cooper

[57] ABSTRACT

A modulated vehicle cruise control system includes a source of vacuum, a servo transducer or control unit connected to the source of vacuum, an engine throttle position servo connected to the servo, a speed sensor and a logic circuit or command module. A modulator is disposed in series with and between the control unit and the source of vacuum. The modulator limits opening movement of the engine throttle by modulating communication of vacuum to the servo to prevent inefficient engine operation.

18 Claims, 4 Drawing Figures

CRUISE CONTROL MODULATOR

This application is a divisional of prior co-pending application Ser. No. 204,066, filed Nov. 4, 1980, now U.S. Pat. No. 4,407,385.

BACKGROUND OF THE INVENTION

The present invention relates to vehicle cruise control systems and more particularly to a unique device for modulating constant speed cruise control systems.

A wide variety of cruise or speed control systems have been proposed for maintaining the speed of a vehicle fairly constant. Such systems automatically vary the throttle position of the carburetor in response to changing load conditions to maintain a constant set speed. Typical commercially available systems include a speed sensor which senses actual vehicle speed and generates a signal which is transmitted to an electronic logic circuit or module. The module compares actual vehicle speed with a desired or "set" speed and generates a control signal which is transmitted to a vacuum servo transducer or control unit. The transducer is typically a valve structure interposed between a vacuum storage tank or a line connected to the engine intake manifold and a vacuum actuator. The vacuum actuator is connected to the vehicle throttle linkage. If the sensed speed is below the set speed, the servo transducer will "open" and vacuum from the storage tank will be applied to the vacuum actuator causing the throttle to open until the "set" speed is reached and/or to maintain the set speed.

When a rapid increase in load occurs, such as when the vehicle approaches a steep incline, typical cruise control systems produce a somewhat violent throttle position change. This violent change can actuate the accelerator pump or enrichment circuits of the carburetor resulting in excessive fuel flow to the intake manifold. This causes inefficient engine operation and a fairly rapid decrease in the intake manifold vacuum level.

Under constant or steady state load conditions, vehicle cruise control devices tend to increase fuel efficiency. Operator induced speed changes which have an adverse effect on fuel efficiency are avoided. However, under increasing load conditions, besides the occurrence of violent throttle position changes, the cruise control systems will reduce intake manifold vacuum levels, through throttle opening, in an attempt to maintain vehicle speed. This also results in a decrease in engine operating efficiency. Examples of automatic vehicle speed or cruise control systems of the aforementioned type may be found in U.S. Pat. No. 3,485,316, entitled AUTOMOBILE SPEED CONTROL and issued on Dec. 23, 1969, to Slavin et al and U.S. Pat. No. 4,170,274, entitled DEVICE FOR REGULATING THE TRAVELING SPEED OF A MOTOR VEHICLE and issued on Oct. 9, 1979, to Collonia.

The intake manifold vacuum level of a spark ignition internal combustion engine is proportional to and a direct indicator of operating or fuel efficiency. An internal combustion engine operates most efficiently under conditions of high intake manifold vacuum. During rapid acceleration and/or high load conditions, intake manifold vacuum levels will drop causing inefficient operation.

Various proposals have been made to indicate to the operator when the vehicle is being operated in an efficient range of intake manifold vacuum levels. One such device is merely a vacuum gauge which delineates efficient and inefficient "areas" of operation. The gauge would be mounted in the vehicle compartment and directly indicates intake manifold vacuum levels. The operator attempts to "modulate" or control depression of the accelerator to maintain intake manifold vacuum levels at the "high" range to thereby increase fuel efficiency.

Intake manifold vacuum level sensors have also been electrically connected to a light signaling device which turns "on" during inefficient vehicle operation. Such devices, of course, have no effect on the operation of an automatic cruise control system which may be incorporated in the vehicle.

Other devices have been proposed which actively indicate inefficient vehicle operation in response to a reduction in intake manifold vacuum levels. These devices sense the intake manifold vacuum level and generate a force which tends to close the throttle valve and create an increased resistance to accelerator movement. An example of one such device may be found in U.S. Pat. No. 4,026,255, entitled VEHICLE ENGINE SIGNAL DEVICE and issued on May 31, 1977, to Weiler, Jr. The device disclosed therein includes a piston cylinder type actuator which is connected to the throttle linkage and is shifted in response to the change in intake manifold vacuum levels. When a "low" vacuum level is encountered, the actuator tends to close the throttle causing increased resistance to depression of the accelerator and thereby actively signaling inefficient vehicle operation. Examples of other such signaling devices may be found in U.S. Pat. No. 2,148,729, entitled CARBURETOR THROTTLE CONTROL and issued on Feb. 28, 1939, to Coffey; U.S. Pat. No. 2,692,980, entitled ENGINE CONDITION SIGNAL ARRANGEMENT FOR AUTOMOTIVE VEHICLES and issued on Oct. 26, 1954, to Platt; U.S. Pat. No. 2,825,418, entitled MOTOR VEHICLE ACCELERATION SIGNAL DEVICE and issued on Mar. 4, 1958, to Kershman; and U.S. Pat. No. 3,958,542, entitled THROTTLE CONTROL APPARATUS USING PEDAL RESISTANCE and issued on Mar. 25, 1976, to Tanner.

With compression ignition or diesel internal combustion engines which are fuel injected, fuel flow rates are controlled by throttle position. Efficiency of operation and hence maximization of fuel economy is directly proportioned to throttle position. Intake manifold vacuum levels in a diesel are essentially nonexistent. As a result, signaling devices of the aforementioned type would not properly indicate inefficient vehicle operation. Automatic, constant speed cruise control systems which have been used with diesel engines do not optimize fuel efficiency under increasing load conditions. Typical diesel cruise control systems are of the same type as have been used on spark ignition engines and which are described above. Such engines include, however, a mechanically driven vacuum pump as a vacuum source.

A need exists for a device and system which will allow a variable vehicle speed within preset limits under light and moderate load conditions but will seek to maintain intake manifold vacuum levels at or above a preset point or throttle positions at or below a preset point to increase efficiency of engine operation when increased and/or high load conditions are experienced. Such a system should also soften or moderate the rapid and wasteful throttle movements which have heretofore been experienced with automatic cruise control systems.

SUMMARY OF THE INVENTION

In accordance with the present invention, the aforementioned need is fulfilled. Essentially, a modulator means is provided which is adapted to be connected in series with the source of vacuum and the servo transducer of a vehicle cruise control system. The modulator means limits opening movement of the throttle causing variable vehicle speed and permitting efficient operation to be maintained. In narrower aspects of the invention, application of vacuum to the actuator is prevented when a predetermined minimum intake manifold vacuum level or maximum throttle position is reached. The modulator means and system in accordance with the present invention "softens" the heretofore experienced rapid throttle movements characteristic of automatic cruise control systems. Since intake manifold levels and/or throttle position are maintained in an efficient range, increased fuel economy is achieved.

In further aspects of the invention, as presently preferred, the modulator means is a vacuum actuated valve having an inlet connected to the cruise control system source of vacuum and an outlet connected to the servo transducer which controls the passage of vacuum to the vacuum servo or throttle positioner. A valve element is positioned in response to throttle position and/or intake manifold vacuum. When a predetermined set point is reached, the valve element is closed, thereby blocking communication of the source of vacuum to the servo actuator. The set point of operation of the modulator means is adjustable by the vehicle operator. The modulator means is readily incorporable into commercially available automatic cruise control systems and permits such systems to maximize fuel efficiency under varying load conditions.

DETAILED DESCRIPTION OF THE PREFERRED EMBODIMENT

Figure 1:
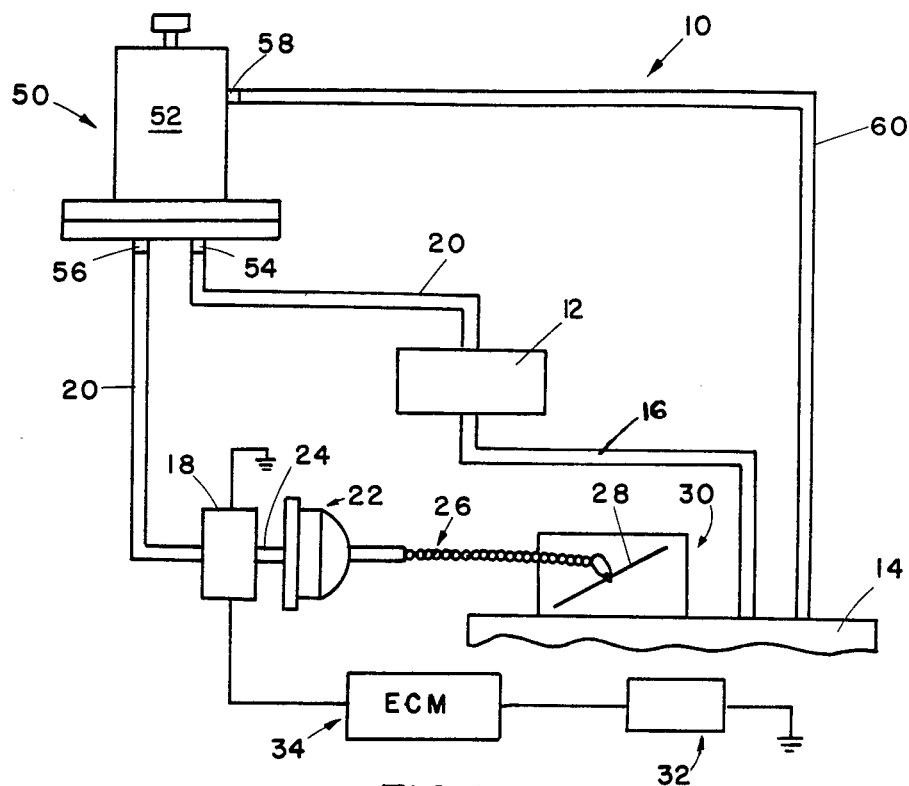
FIG. 1 is a schematic illustration of a cruise control system in accordance with the present invention incorporating a vacuum modulator which is responsive to intake manifold vacuum levels.

FIG. 1 schematically illustrates an automatic vehicle cruise control system which is primarily adapted for use with a spark ignition, internal combustion engine. The system, generally designated 10, includes a vacuum reservoir or storage tank 12 connected to a vehicle intake manifold 14 through tubing 16. The source of vacuum 12 is connected to a servo transducer or control unit 18 through tubing 20. Control unit 18 is connected to a vacuum actuated servo 22 through tubing 24. Servo 22 typically includes a spring loaded diaphragm shifted in response to application of vacuum through unit 18. Actuator 22 is coupled through linkage 26 to throttle 28 of a carburetor 30 of the engine. The system 10 further includes a speed sensor 32. Sensor 32 senses actual vehicle speed and generates an electrical signal transmitted to an electronic logic circuit or command module (ECM) generally designated 34. The electronic command module compares actual vehicle speed to a "set" speed which has been inputted by the vehicle operator and generates an error signal which is transmitted to controller 18. If the set speed is above actual vehicle speed, unit 18, which contains a valve (not shown), will open to permit vacuum to be applied to the servo 22, thereby causing the throttle 28 to open. If the set speed is below the actual vehicle speed, unit 18 shuts off vacuum and/or bleeds servo 22 so that throttle valve 28 will move towards a closed position. The precise circuitry and structure of controller 18, speed sensor 32 and the electronic command module 34 are well-known in the art and will not be described in detail here. If necessary, reference may be had to the aforementioned U.S. Pat. Nos. 3,485,316 and 4,170,274.

VACUUM MODULATOR

In accordance with the present invention, system 10 includes a modulator means generally designated 50. In the embodiment of FIG. 1, modulator means 50 is positioned in series with unit 18 through tubing 20. The modulator means functions to limit and/or cut off communication of vacuum from reservoir 12 to unit 18 and hence servo 22 when the intake manifold vacuum level drops to a predetermined minimum set point.

Figure 2:
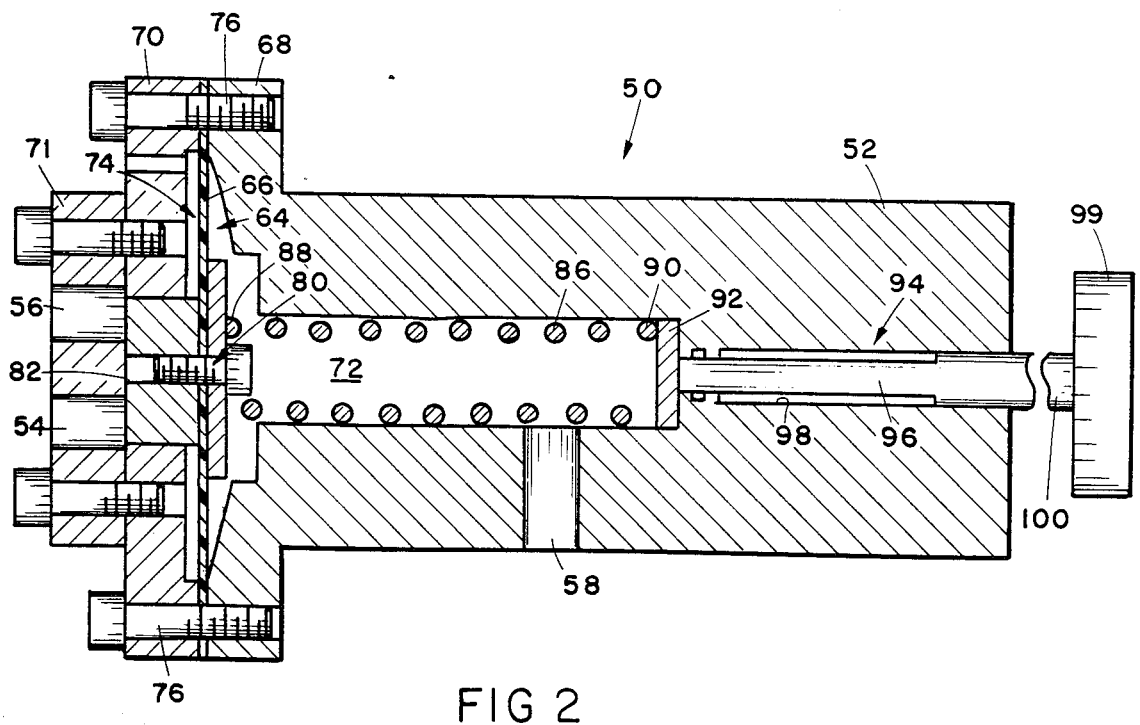
FIG. 2 is an elevational view in cross section of the modulator means incorporated in the system of FIG. 1.

As illustrated in FIGS. 1 and 2, modulator 50 includes a valve body 52 which defines a vacuum inlet 54, a vacuum outlet 56 and a control port inlet 58. Tubing 20 is connected to the vacuum inlet 54 downstream of reservoir 12. Vacuum is communicated to unit 18 through vacuum outlet 56. Control port 58 is connected through suitable tubing 60 to the intake manifold vacuum 14 so that actual intake manifold vacuum levels are transmitted to the modulator 50.

As seen in FIG. 2, valve body 52 defines a diaphragm cavity 64 within which is disposed a flexible wall or diaphragm 66. Diaphragm 66 is clamped between a generally circular flange portion 68 and an end plate 70. Diaphragm 66, therefore, defines a first chamber 72 and a second chamber 74. Plate 70 is secured to the main portion of housing 72 by suitable fasteners 76. Plate 70 has another plate 71 secured thereto which defines inlet port 54 and outlet port 56. A valve element 80 is carried by diaphragm 66 and is positioned coaxially therewith. Valve element 80 is shiftable towards and away from a valve seat 82. When in the position shown in FIG. 2, communication between inlet 54 and outlet 56 is closed off.

Control port 58 communicates with chamber 72. A resilient means illustrated in the form of a coil spring 86 has an end 88 engaging valve element 80 and hence diaphragm 66. An opposite end 90 of the resilient means engages an abutment plate 92 of an adjustment means generally designated 94. Adjustment means 94 in the embodiment illustrated comprises an elongated rod 96 threadably disposed in a bore 98 which is coaxial with spring 86, valve element 80 and diaphragm 66. An adjustment knob 99 is nonrotatably secured to an end 100 of rod 96 which extends out of valve housing 52.

As should be apparent, spring 86 biases the diaphragm and hence the valve element towards a first or closed position. By adjusting rod 94, the preload that spring 86 exerts on diaphragm 66 may be varied. As a result, the initial force that the spring exerts can be increased or decreased through rotation of rod 94. Intake manifold vacuum communicating with port 58 through tubing 60 tends to move diaphragm 66 towards a second or open position against the bias or force of spring 86 so that inlet 54 and outlet 56 are in communication with each other.

OPERATION

In operation, the conventional components of the cruise control system function in a "normal" fashion. Under light or moderate load conditions, the command module 34 controls servo 22 through control means 18 to position the throttle valve 28 to maintain an essentially constant vehicle speed. Under such conditions, the intake manifold vacuum levels transmitted to modulator 50 through tubing 60 are high enough to keep valve element 80 off its seat 82. When increasing load conditions are encountered, such as when the vehicle approaches an incline, throttle valve 28 will be moved towards a more open position resulting in a decrease in the intake manifold vacuum level. This decreased level is transmitted to modulator 50 causing the valve element to start to move towards its first or closed position. When the predetermined set point is reached, as adjustably set by adjustment means 94, the vacuum level drops below that necessary to hold valve element 80 away from its valve seat. Communication between inlet 54 and outlet 56 is prevented when the valve element closes. As a result, the automatic cruise control system, while "calling" for increased throttle opening through the speed sensor and command module 84, is overridden and further opening of the throttle valve by the servo is prevented. The vehicle speed will decrease, and intake manifold vacuum levels are maintained at or above the set point. This variable speed operation in response to load conditions increases fuel efficiency.

Typically, the set point would be adjusted so that the valve 58 is open at vacuum levels equal to or above 10 to 13 inches Hg. Valve element 80 will move from its second to its first position in direct response to a decrease in intake manifold vacuum levels and rapid or violent throttle position changes are softened or modulated through a gradual decrease in communication of vacuum to the controller 18. If the vehicle's speed should drop below an acceptable level, such as when an unusually steep incline is encountered, the operator need merely depress the accelerator pedal in a conventional fashion to override the system, open the throttle and increase the vehicle's speed.

It is presently envisioned that the cruise control system could incorporate a bypass line and valve around modulator 50. The valve would be "normally closed" and electrically connected to additional logic circuits into which a predetermined minimum vehicle speed would be set. When minimum actual speed is sensed by sensor 32, the bypass valve could open causing "normal" operation of the system. Also, the logic circuits could directly control unit 18 and be coupled to module 34 so that upon reaching the minimum set speed, module 34 would be disabled and unit 18 would be controlled by the additional logic circuits. The actuator 22 would then be operated to maintain the minimum set speed. When vacuum levels increase and/or load decreases, operation could be returned to module 34 and modulator 50.

DIESEL ENGINE MODULATOR

System 10, illustrated in FIGS. 1 and 2, is primarily adapted for use with spark ignition, conventionally carbureted, internal combustion engines wherein intake manifold vacuum level is directly proportional to engine operating efficiency and fuel flow. In a diesel engine which is fuel injected, throttle position is the best indicator of fuel efficiency since throttle position is directly proportional to fuel flow and the brake mean effective pressure of the engine, except under "overfueling" conditions. Overfueling conditions are evidenced by increased exhaust smoke, and increased fuel levels produce reduced power output. In a diesel engine, there is no real or usable manifold vacuum, and throttle position is an accurate indicator of efficiency of operation.

Figure 3:
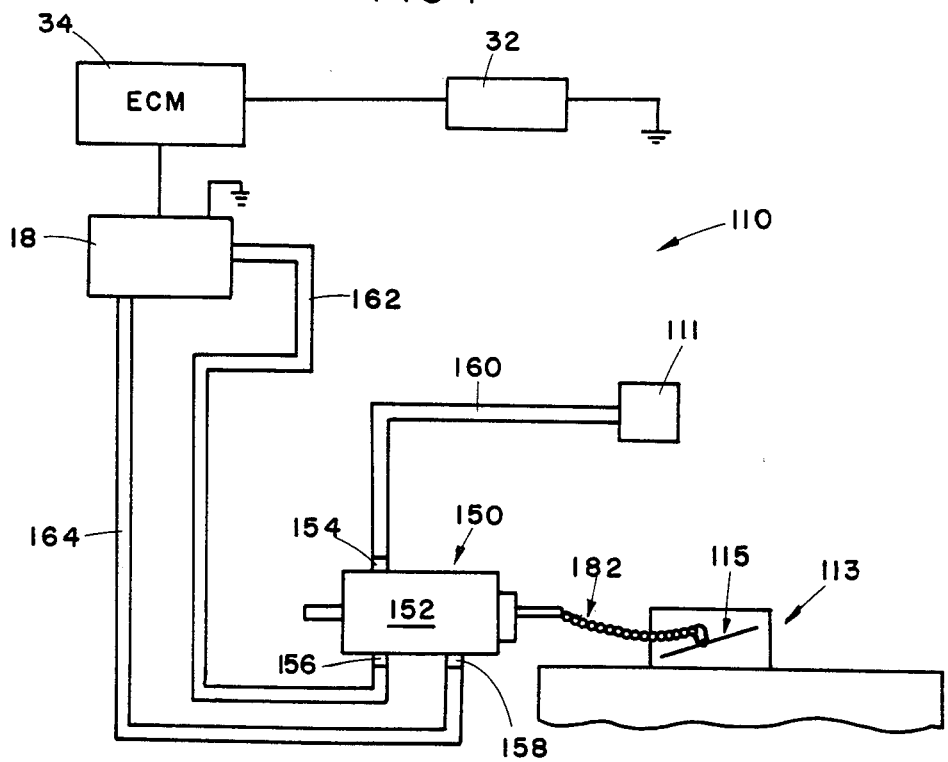
FIG. 3 is a schematic illustration of a cruise control system in accordance with the present invention incorporating a vacuum modulator which is responsive to throttle position and which is therefore primarily adapted for use with diesel or compression ignition internal combustion engines.
Figure 4:
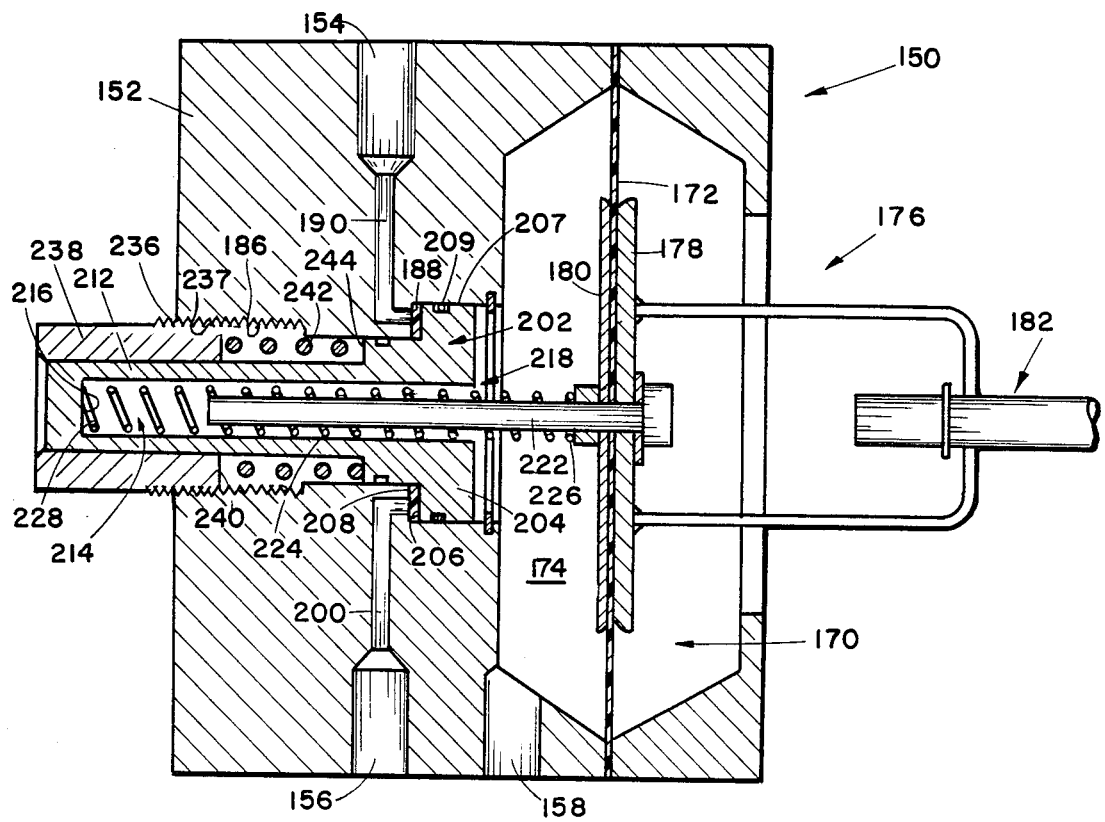
FIG. 4 is an elevational view in cross section of the modulator means incorporated in the system of FIG. 3.

The embodiment illustrated in FIGS. 3 and 4 is a modulated vehicle cruise control system primarily adapted for diesel or compression ignition internal combustion engines. The system as schematically illustrated in FIG. 3 is generally designated 110. As with system 10, the embodiment of FIG. 3 includes a vacuum source 111, a servo transducer or control unit 18, a vehicle speed sensor 32 and a command module 34. Vacuum source 111 is a conventional, mechanically driven vacuum pump and reservoir included to power the system and/or other vehicle accessories. The diesel engine also includes an air inlet 113 having a throttle 115.

The modulator means is generally designated 150 in FIGS. 3 and 4. Modulator 150 replaces the vacuum actuated servo 22 of system 10. Modulator 150 operates in response to throttle position and includes a valve body 152, a vacuum inlet port 154, a vacuum outlet port 156 and a diaphragm control port 158. Inlet 154 is connected to the vacuum reservoir 12 through suitable tubing 160. Vacuum outlet 156 is connected to control unit 18 through suitable tubing 162. Diaphragm control port 158 is connected to control unit 18 through suitable tubing 164. Therefore, modulator 150 is placed in series with the cruise control servo transducer or unit 18 and the source of vacuum 12.

As best seen in FIG. 4, valve body 152 of modulator 150 defines a first cavity or diaphragm chamber 170 within which is supported a flexible wall or diaphragm element 172. Diaphragm 172 defines a chamber 174 which is placed in communication with vacuum through control port 158. Secured centrally of diaphragm 172 is a bracket 176. Bracket 176 is welded or otherwise suitably secured to a pair of plates 178, 180 which are sandwiched about diaphragm 172. Bracket 176 is connected to the existing throttle linkage via member 182 (FIG. 3). As should be apparent, application of vacuum to control port 158 moves diaphragm 172 to the left, when viewed in FIG. 4, thereby opening the throttle 28.

Valve body 152 further defines an elongated bore 186 which is coaxial with diaphragm 172. Bore 186 is stepped in cross-sectional configuration and defines an annular valve seat 188. Inlet 154 communicates through a passage 190 with bore 186 at valve seat 188. Similarly, vacuum outlet 156 communicates with bore 186 at valve seat 188 through a passage 200.

Slidably disposed within bore 186 is an elongated, generally cylindrical valve element generally designated 202. Valve element 202 includes a generally circular portion 204 defining a valve face 206 carrying a suitable valve seat seal 208. Portion 204 also defines a seal groove 207 within which is disposed an O-ring seal 209. Joined to circular portion 204 is an elongated portion 212. Portion 212 defines a blind bore 214 having a closed end 216 and an open end 218 which faces diaphragm 172.

Extending into blind bore 212 from diaphragm 172 is an elongated rod 222. Positioned around rod 222 is a first resilient means 224, illustrated as a coil spring. Coil spring 224 includes a first end 226 which abuts diaphragm 172 and a second end 228 which abuts the closed end 216 of bore 214. As should be readily apparent, spring 224 biases or generates a force tending to move valve element 202 towards a first or closed position at which communication between inlet 154 and outlet 156 through bore 186 is prevented.

Bore 186 opens through an outer face 236 of valve body 152. An inner peripheral surface 237 of the bore is threaded and adjustably receives an externally threaded nut or member 238. Member 238 includes an inner face 240. A second resilient means 242 is positioned between face 240 and a shoulder 244 defined by the valve element. Means 242 is shown as a coil spring and has a spring rate greater than that of spring 224. Spring 242 tends to bias or create a force which shifts the valve element face 202 away from valve seat 188. The preload or the initial force spring 242 exerts on the valve element is adjusted by movement of adjustment member or nut 238 within the threaded portion of the bore 186.

OPERATION

The operation of embodiment 110 is similar to that of embodiment 10 in that modulator 150 cuts off communication of vacuum from source 111 to the throttle positioning servo. Modulator 152 incorporates the throttle positioning servo so that valve element closure occurs and responds to opening movement of the servo actuator.

Under light or moderate load conditions, vacuum from source 111 is communicated to chamber 174 by passing through inlet 154, outlet 156, control unit 18 and to diaphragm control port 158. The cruise control system, therefore, operates in a "normal" fashion with throttle position being set in direct response to a comparison of set speed with actual speed. As increased load conditions are encountered and diaphragm 172 moves further to the left, when viewed in FIG. 4, to further open the throttle, an increased force is exerted on the valve element by the first resilient means 224. When the force created by spring 224 overcomes the countering force created by spring 242, the valve will seat and close off the inlet port 154. As a result, vacuum from source 11 will no longer communicate with the servo chamber 174 through control unit 18 and further opening of the throttle valve 28 is prevented.

As with modulator 50, movement of the valve from a second, fully open position towards a first or closed position modulates or "softens" harsh throttle movements which have heretofore been experienced with cruise control systems when encountering a rapidly increasing load condition. The valve element in effect defines a variable restriction. The maximum, open throttle position is limited to a preset point. Inefficient engine operation is reduced or eliminated. The specific set point at which the valve element closes is readily adjustable by rotation of member 238. This increases the initial force or preload that spring 244 exerts on the valve element. When the preload or initial force is increased, increased throttle movement in an opening direction is required before first resilient means 224 generates enough force to overcome that created by spring 244.

In view of the foregoing description, it should be readily apparent to those of ordinary skill in the art that the vacuum and throttle modulator in accordance with the present invention automatically limit throttle opening to prevent inefficient engine operation. The modulators are readily incorporable into existing cruise control systems without modification of such systems. The modulators are merely placed in line downstream of the source of vacuum and upstream of the cruise control servo transducer or control circuit which normally controls transmission of vacuum to the vacuum servo actuator. In the embodiments of FIGS. 3 and 4, the vacuum servo actuator of the conventional systems is removed and modulator 150 is substituted therefor. The systems obtain constant speed operation at light or moderate load levels and automatically prevent inefficient operation when an increased load is encountered, such as when the vehicle encounters an incline.

Those of ordinary skill in the art will now undoubtedly envision various modifications to the present invention which would not depart from the patentable concepts disclosed herein. For example, the specific configuration of the valve elements and the valve seats could be modified without changing the functioning of the modulator. For example, the valve element could be a tapered needle which would close off communication of an inlet passage with an outlet passage. Other "flexible" walls means, such as a bellows, could be substituted for the diaphragm. Further, resilient means other than the coil springs illustrated could be substituted to create the required biasing forces. Therefore, it is expressly intended that the above description should be considered as that of the preferred embodiments only. The true spirit and scope of the present invention may be determined by reference to the appended claims.

The embodiments of the invention in which an exclusive property or privilege is claimed are defined as follows:

1. In a vehicle cruise control system of the type including a vacuum actuated servo connected to an engine throttle valve, a source of vacuum and a control means connecting the source of vacuum to the servo for controlling throttle position to maintain a preset vehicle speed, the improvement comprising adjustable modulator means operatively connected to said control means and said servo for automatically limiting opening movement of the throttle by modulating communication of vacuum through said control means to said servo to override said control means during normal operation of said control means so that vehicle speed will drop below the preset vehicle speed which the control means seeks to maintain upon the vehicle encountering an incline to increase fuel efficiency and soften throttle position changes.

2. In a vehicle cruise control system as defined by claim 1 wherein said modulator means comprises:
   a valve body defining an inlet port connected to the source of vacuum, an outlet port connected to said control means and a valve element chamber;
   a valve element shiftable within said chamber between a first position wherein said inlet port is closed and a second position wherein said inlet port is open so that vacuum is communicated to said control means; and
   means engaging said valve element for shifting said valve element to said first position in response to opening movement of the throttle valve to prevent further application of vacuum to said vacuum servo through said control means when a predetermined throttle valve position is reached, said throttle valve opening position being controlled by said servo.

3. In a vehicle cruise control system as defined by claim 2 wherein said vacuum actuated servo includes a housing, a diaphragm disposed within said housing, a vacuum port connected to the source of vacuum through said control means for communicating vacuum to one side of the diaphragm, and a bracket secured to said diaphragm and connected to the throttle.

4. In a vehicle cruise control system as defined by claim 3 wherein said means engaging said valve element comprises:
a first resilient means positioned between said servo diaphragm and said valve element for biasing said valve element towards said first position as vacuum is communicated to said one side of said diaphragm; and
second resilient means disposed within said valve body and engaging said valve element for biasing said valve element towards its second position against the force generated by said first resilient means whereby when the servo diaphragm reaches a predetermined position, said first resilient means will overcome the force created by said second resilient means and said valve element will move to its first position preventing communication of said source of vacuum to said servo diaphragm through said control means.

5. In a vehicle cruise control system as defined by claim 4 wherein said modulator means further includes: adjustment means engaging said second resilient means for adjusting the preload said second resilient means exerts on said valve element.

6. In a vehicle cruise control system as defined by claim 5 wherein said valve body and said servo housing comprise a single unit and said valve element is positioned coaxially with said diaphragm.

7. In a vehicle cruise control system as defined by claim 6 wherein said first resilient means comprises a coil spring having a first spring rate, said coil spring having an end engaging said diaphragm and another end engaging said valve element.

8. In a vehicle cruise control system as defined by claim 7 wherein said second resilient means comprises a second coil spring having a second spring rate, said second coil spring having an end engaging said valve element and another end engaging said adjustment means.

9. In a vehicle cruise control system as defined by claim 7 wherein said adjustment means comprises said valve body defining a threaded bore coaxial with said second coil spring and an externally threaded member threadably disposed within said bore and having a face engaging said another end of said second coil spring.

10. A throttle position modulator for use in a vehicle cruise control system of the type including a source of vacuum, said modulator comprising:
a valve body defining a diaphragm chamber, a control port opening into said chamber and adapted to be connected to a control valve, said body further defining a vacuum inlet port, a vacuum outlet port and a valve seat, said vacuum inlet and outlet ports opening through said valve seat;
a diaphragm supported within said diaphragm chamber;
throttle connecting means secured to said diaphragm for connecting said diaphragm to a throttle;
a valve element movably supported within said valve body and movable between a first position engaging the valve seat and closing said vacuum inlet port and a second position away from said valve seat so that said vacuum inlet port communicates with said vacuum outlet port; and
set point means engaging said valve element for causing said valve element to move to its first position in response to movement of said diaphragm.

11. A throttle position modulator as defined by claim 10 wherein said set point means comprises:
first resilient means engaging said diaphragm and said valve element for resiliently biasing said valve element towards its first position and creating a force tending to move said valve element to its first position, which force increases with movement of the diaphragm; and
second resilient means supported within said body and engaging said valve element for resilient biasing said valve element towards its second position against the bias of said first resilient means.

12. A throttle position modulator as defined by claim 11 further including adjustment means engaging said second resilient means for adjusting the bias of said second resilient means on said valve element whereby the set point at which said valve element moves to its first position in response to movement of said diaphragm may be adjusted.

13. A throttle position modulator as defined by claim 12 wherein said valve body defines an elongated bore which is coaxial with said diaphragm, said valve element being generally circular in cross section and being slidably disposed within said bore, said valve body further defining an annular shoulder defining said valve seat.

14. A throttle position modulator as defined by claim 13 wherein said first resilient means comprises a coil spring having an end engaging said diaphragm and another end engaging said valve element.

15. A throttle position modulator as defined by claim 14 wherein said second resilient means comprises another coil spring having an end engaging said valve element in opposed relationship to said first resilient means.

16. A throttle position modulator as defined by claim 15 wherein said adjustment means comprises a threaded member threadably disposed within said bore for movement towards and away from said valve element, said another coil spring having an end engaging said threaded member.

17. In a vehicle cruise control system of the type including a throttle positioner connected to an engine throttle for opening the throttle and control means sensing actual vehicle speed and actuating the throttle positioner to maintain vehicle speed at a preset speed, the improvement comprising:
adjustable modulator means operatively connected to said control means for overriding said control means at an adjustable set point during normal operation of said control means to soften throttle movement and limit opening movement of the engine throttle causing a decrease in vehicle speed below the preset speed to increase fuel efficiency when the vehicle encounters an incline.

18. In a vehicle cruise control system as defined by claim 17 wherein the system further includes a source of vacuum and the throttle positioner is connected to the source of vacuum through said control means and said modulator means includes a valve means interposed between said source of vacuum and said throttle positioner for shutting off communication between said source of vacuum and said throttle positioner.

* * * * *